(12) United States Patent
Ho et al.

(10) Patent No.: US 8,730,623 B2
(45) Date of Patent: May 20, 2014

(54) HEAD STACK ASSEMBLY AND DISK DRIVE UNIT WITH THE SAME

(75) Inventors: Yiusing Ho, Hong Kong (CN); Masahiko Fujioka, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 344 days.

(21) Appl. No.: 12/656,197

(22) Filed: Jan. 20, 2010

(65) Prior Publication Data

US 2011/0176239 A1    Jul. 21, 2011

(51) Int. Cl.
*G11B 21/16* (2006.01)
*G11B 5/48* (2006.01)

(52) U.S. Cl.
USPC .................. 360/266.1; 360/265.6

(58) Field of Classification Search
CPC .............. G11B 5/4813; G11B 5/4833; G11B 7/08576; G11B 21/02; G11B 5/54; G11B 21/16; G11B 5/484
USPC ................ 360/264.3, 265.7–266.1
See application file for complete search history.

(56) References Cited

U.S. PATENT DOCUMENTS

| | | | |
|---|---|---|---|
| 5,491,599 A * | 2/1996 | Sogabe | 360/265.6 |
| 5,512,725 A * | 4/1996 | Kelemen et al. | 219/121.64 |
| 5,751,519 A * | 5/1998 | Hata | 360/265.6 |
| 6,018,441 A * | 1/2000 | Wu et al. | 360/265.6 |
| 6,903,903 B1 * | 6/2005 | Fruge et al. | 360/265.7 |
| 7,367,107 B1 * | 5/2008 | Fruge et al. | 29/603.04 |
| 8,040,638 B2 * | 10/2011 | Raymond | 360/266 |
| 2004/0264061 A1 * | 12/2004 | Hong et al. | 360/265.7 |
| 2005/0057860 A1 * | 3/2005 | Lau et al. | 360/265.7 |
| 2006/0158788 A1 * | 7/2006 | Cho | 360/265.9 |

* cited by examiner

*Primary Examiner* — Will J Klimowicz
(74) *Attorney, Agent, or Firm* — Nixon & Vanderhye, P.C.

(57) ABSTRACT

Disclosed is a head stack assembly, which comprises a pivot bearing assembly having a main body which comprising a first end surface and a second end surface, and a flange extended from the main body and located between the first and second end surfaces, the flange having a first interface adjacent the first end surface of the main body and a second interface opposite to the first interface; a drive arm mounted on the main body and secured on the first interface of the flange; and a fantail spacer mounted on the main body and secured on the second interface of the flange.

7 Claims, 7 Drawing Sheets

HEAD STACK ASSEMBLY AND DISK DRIVE UNIT WITH THE SAME

FIELD OF THE INVENTION

The present invention relates to an information recording device, particularly relates to a disk drive unit and, more particularly to a head stack assembly (HSA) used in a disk drive unit.

BACKGROUND OF THE INVENTION

One known type of information storage device is a disk drive unit that uses magnetic media to store data and a movable read/write head that is positioned over the magnetic media to selectively read from or write to the rotating magnetic media, such as magnetic disks.

Figure 1A:
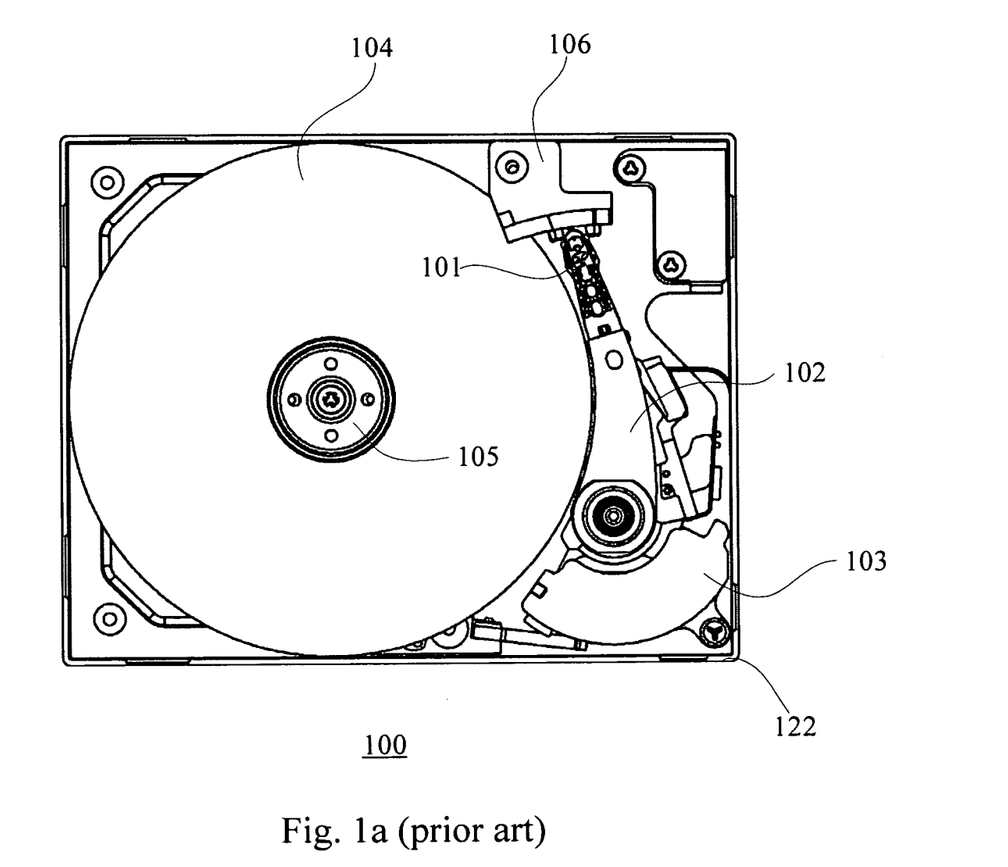
FIG. 1a is a top plan view of a conventional disk drive unit.

FIG. 1a illustrates a conventional disk drive unit 100 and show a magnetic disk 104 mounted on a spindle motor 105 for spinning the disk 104. A head stack assembly (hereinafter referred as to HSA) 102 carries a slider 101 incorporating a read/write head. A voice-coil motor (VCM)103 is provided for controlling the motion of the HSA 102 and, in turn, controlling the slider 101 to move from track to track across the surface of the disk 104, thereby enabling the read/write head to read data from or write data to the disk 104. In operation, a lift force is generated by the aerodynamic interaction between the slider 101 and the disk 104. The lift force is opposed and balanced such that a predetermined flying height above the surface of the spinning disk 104 is maintained over a full radial stroke of the HSA 102. Also provided is a load/unload mechanism 106, which usually is embodied as a ramp to load/unload the slider 101 therefrom. In addition, all above components are disposed in an enclosure 122.

Figure 1B:
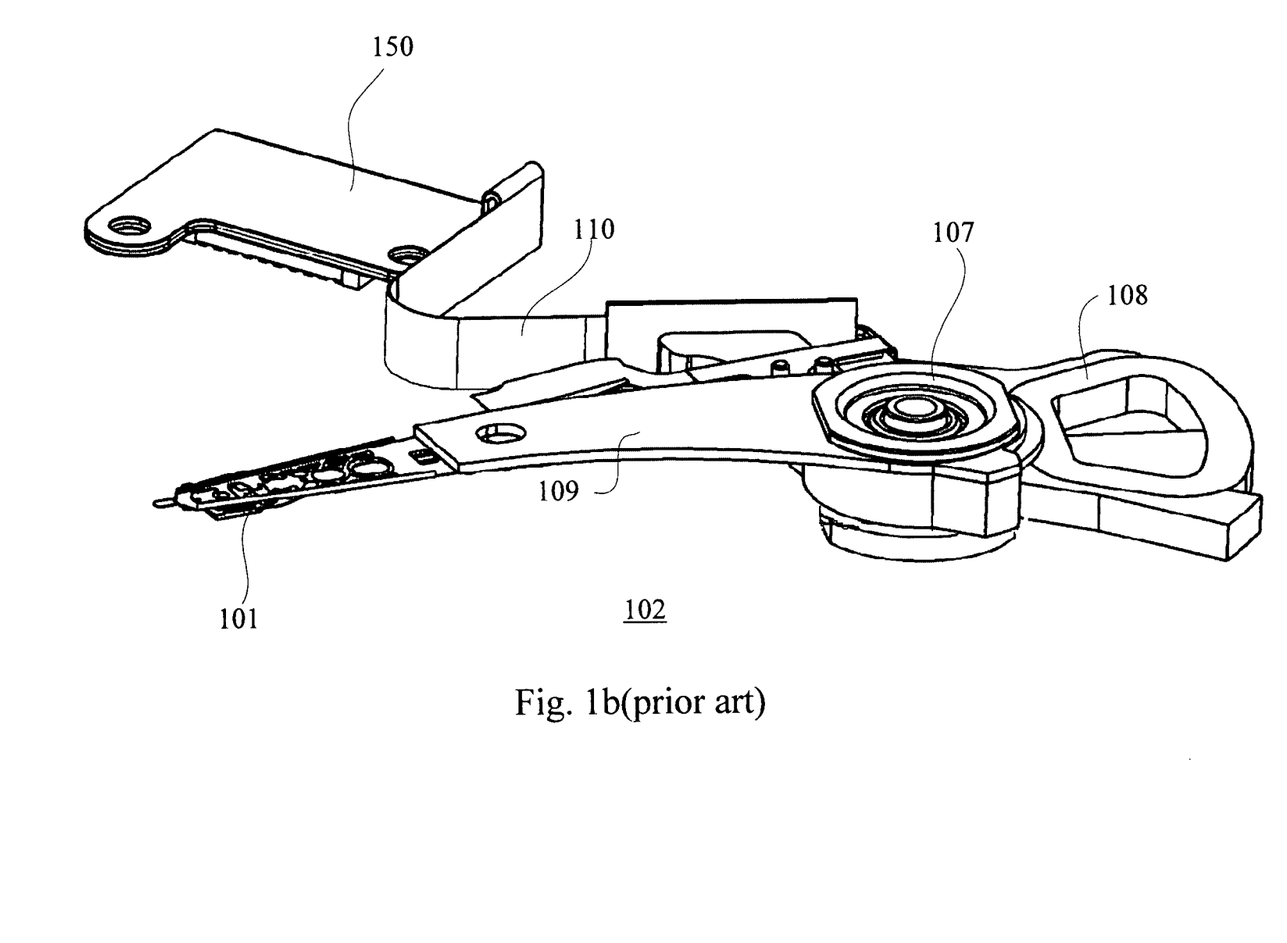
Figure 1C:
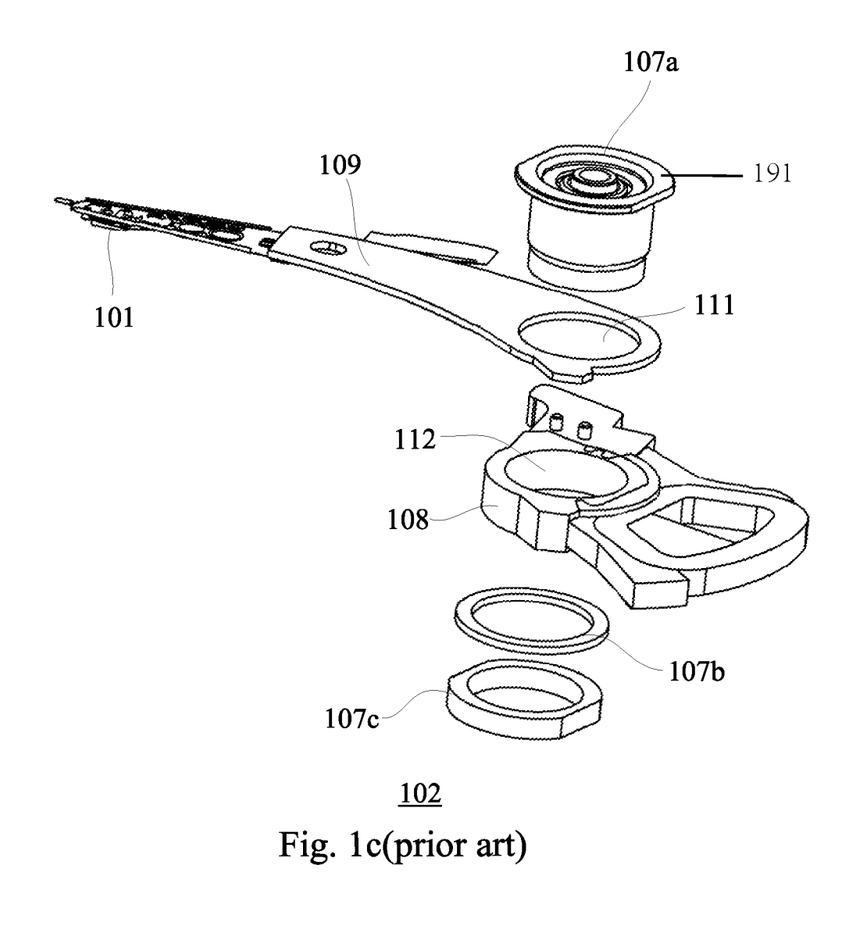
FIG. 1c is an exploded perspective view of the HSA shown in FIG. 1b.
Figure 2A:
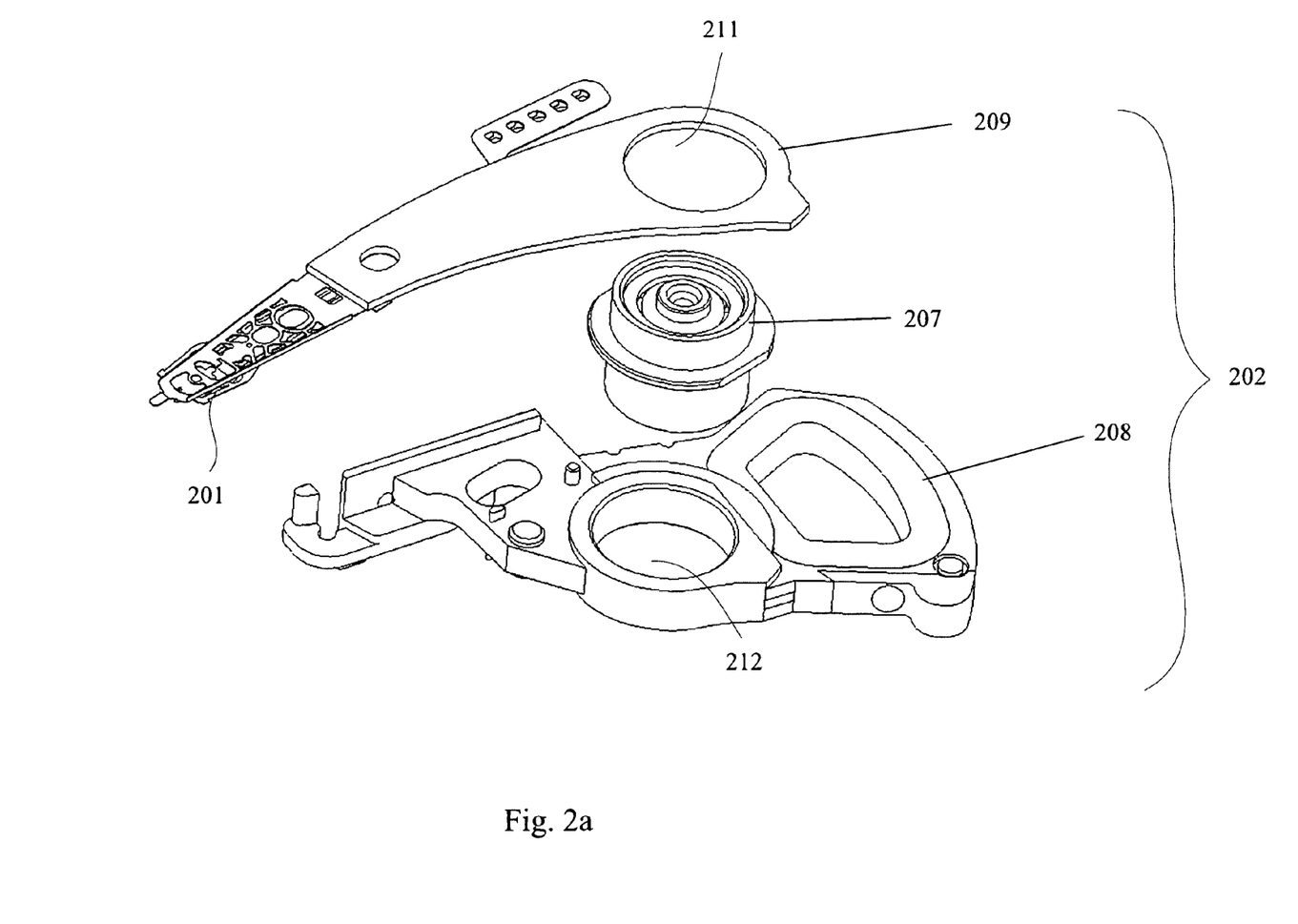
FIG. 2a is an exploded perspective view of a HSA according to an embodiment of the invention.
Figure 2B:
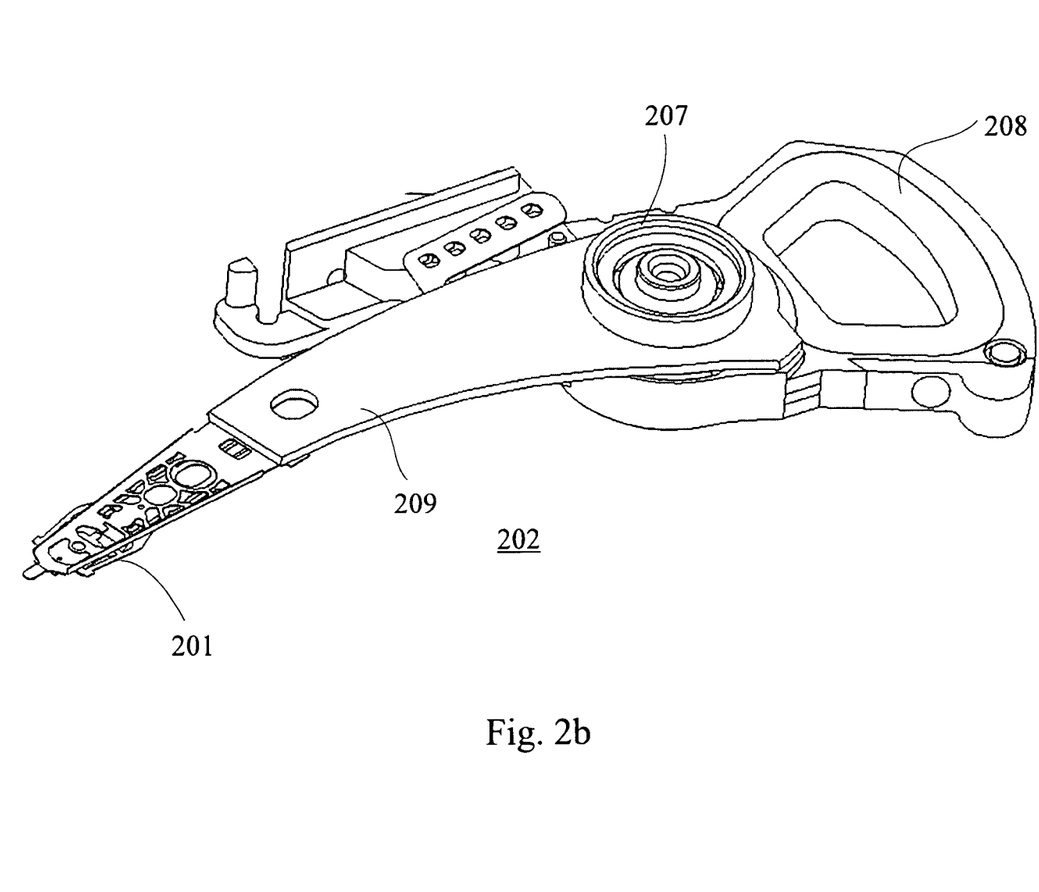
FIG. 2b shows an assembled HSA of FIG. 2a in a perspective view.

FIGS. 1b-c show in more detail the HSA of the disk drive unit of FIG. 1a. As depicted in the drawings, the HSA 102 comprises a drive arm 109 which has a mounting hole defined in its proximal end and which has a slider 101 disposed at its distal end, a fantail spacer 108 having a through hole defined therein, and a pivot bearing assembly to interconnect the drive arm 109 and the fantail spacer 108. The HSA 102 may further have a flex print circuit board assembly (FPCBA) 150 coupled to the remainder of the HSA 102 via a flex cable 110 so as electrically connect the HSA 102 with an external control device.

The pivot bearing assembly 107 comprises a pivot bearing 107a with a flange 191 extended radially from outer circumferential surface thereof, a washer 107b and a screw nut 107c, both of which are used cooperatively for securing the drive arm 109 and the fantail spacer 108 together. In assembling process of the HSA 102, first, the pivot bearing 107a passes through the mounting hole 111 of the drive arm 109 and the through hole 112 of the fantail spacer 108 such that end surface of the drive arm 109 is pressed forcibly against the flange 191 and the fantail spacer 108 is securely pressed against the drive arm 109. Then, the washer 107b and screw nut 107c are employed to fasten the drive arm 109 and fantail spacer 108 onto the pivot bearing 107a.

However, manufacturing cost of this type of HSA is inherently increased as additional components, i.e., a washer and screw nut are inevitably used for mounting purpose. Besides, as additional components are used in assembly process, assembly process is complicated and time-consumed.

Thus, it is desired to provide a novel HSA which overcomes drawbacks of prior art.

SUMMARY OF THE INVENTION

One object of the invention is to provide a HSA, which is simple in construction, thereby reducing manufacturing cost thereof.

Another object of the invention is to provide disk drive unit, which is simple in construction, thereby reducing manufacturing cost thereof.

To achieve the above objects, a head stack assembly comprises a pivot bearing assembly having a main body which comprising a first end surface and a second end surface, and a flange extended from the main body and located between the first and second end surfaces, the flange having a first interface adjacent the first end surface of the main body and a second interface opposite to the first interface; a drive arm mounted on the main body and secured on the first interface of the flange; and a fantail spacer mounted on the main body and secured on the second interface of the flange.

The drive arm has a mounting hole defined therein, and an upper portion of the main body from the first end surface to the first interface of the flange is received in the mounting hole. The fantail spacer has a through hole defined therein, and a lower portion of the main body from the second interface of the flange to the second end surface of the main body is received in the through hole.

The drive arm is secured on the first interface of the flange by means of laser welding. The fantail spacer is secured on the second interface of the flange by means of adhesive. The adhesive is epoxy. In another embodiment, the fantail spacer may also be secured on the second interface of the flange by means of laser welding, for example.

A disk drive unit comprises a disk; a spindle motor for spinning the disk; a head stack assembly; and a voice coil motor to rotate the head stack assembly such that the head stack assembly can move across the surface of the disk. The head stack assembly comprises a pivot bearing assembly having a main body which comprising a first end surface and a second end surface, and a flange extended from the main body and located between the first and second end surfaces, the flange having a first interface adjacent the first end surface of the main body and a second interface opposite to the first interface; a drive arm mounted on the main body and secured on the first interface of the flange; and a fantail spacer mounted on the main body and secured on the second interface of the flange.

Compared with conventional HSA, since a flange is provide on an outer race of a pivot bearing assembly and between the two end surfaces of the outer race, the drive arm and the fantail spacer can be mounted on the flange respectively such that the drive am and fantail spacer are fastened on opposite sides of the flange, thereby forming a HSA without any additional components inevitably necessary in a conventional HSA. Therefore, a HSA of simplified construction is achieved, and accordingly, manufacturing cost thereof is also reasonably reduced.

Other aspects, features, and advantages of this invention will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various embodiments of this invention. In such drawings:

FIG. 1b is a perspective view of a HSA of the disk drive unit shown in FIG. 1a;

FIG. 3 shows a perspective view of a pivot bearing assembly of the HSA of FIG. 2a;

DETAILED DESCRIPTION OF THE INVENTION

Now reference is made to FIGS. 2a-2b and FIGS. 3-4, in which a head stack assembly (HSA) according to a preferred embodiment of the invention is described in detail. Particularly referring to FIG. 2a-2b, a HSA 202 comprises a drive arm 209 made of any suitably rigid material such as stainless steel so as to sufficiently support a slider 201 mounted on one end thereof. Formed in the other end of the drive arm 209 is a mounting hole 211 for securing the drive arm 209 to other component (will be described later). The HSA 202 further comprises a fantail spacer 208 with a through hole 212 defined therein, the through hole 212 being corresponding to the mounting hole 211 of the drive arm 209. The drive arm 209 and the fantail spacer 208 are fastened together by a pivot bearing assembly 207, which will be described below in more detail.

Figure 3:
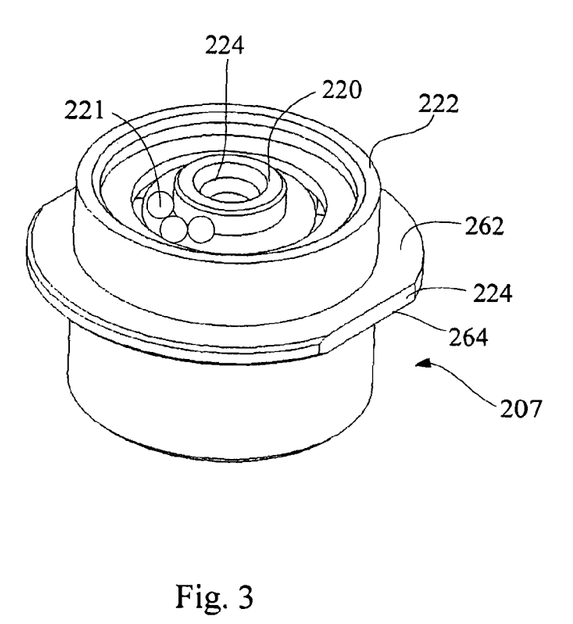
Figure 4:
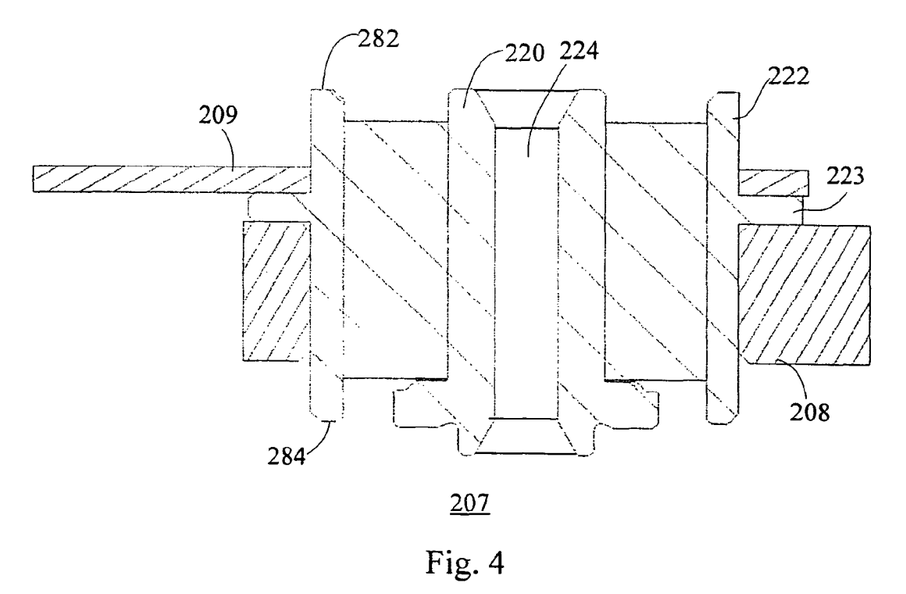
FIG. 4 shows a partial cross-sectional view of the HSA of FIG. 2b.

Now referring to FIGS. 3-4, the pivot bearing assembly 207 is substantially a cylinder shape, and comprises an inner race 220 made of rigid material such as steel. A shaft hole 224 is formed in the inner race 220.

The pivot bearing assembly 207 further comprises an outer race 222 which also can be constructed of rigid material for example steel. A plurality of rollers 221 (only several are shown in the drawing) are operatively disposed between the inner race 220 and the outer race 222. These inner race 220, outer race 222 and rollers 221 operatively function as a rotatable main body of the pivot bearing assembly 207. Namely, when the inner race 220 is secured on a shaft (not shown) by tight fitting between the shaft hole 224 and the shaft, the outer race 222 will be able to rotate around a center axis of the shaft due to rolling movement of the rollers 221 disposed between the outer race 222 and inner race 220.

It is noted that the rollers 221 may take any suitable form that is available now. As an example, the rollers 221 may be ball type rollers. Alternatively, the rollers 221 may be needle type rollers. The outer race 222 has a first end surface 282 which is perpendicular to the center axis of the shaft, and a second end surface 284 opposite to the first end surface 282.

Notably, a flange 223 extends outwardly from the outer race 222 for supporting and mounting the drive arm 209 and the fantail spacer 208. In particular, the flange 223 extends outwardly from an outer circumferential surface of the outer race 222 and is substantially parallel to both the first and second end surfaces 282, 284 of the outer race 222. The flange 223 includes a first interface 262 adjacent the first end surface 282 of the outer race 222 to carry the drive arm 209 thereon, and a second interface 264 opposite to the first interface 262 and adjacent the second end surface 284 of the outer race 222 to carry the fantail spacer 208 thereon. The flange 223 divides the outer race 222 into two portions, namely an upper portion mainly from the first end surface 282 to the first interface 262, and a lower portion mainly from the second interface 264 to the second end surface 284.

During assembling process, firstly, the drive arm 209 is positioned on the flange 223 of the outer race 222 such that the drive arm 209 is partially supported on the first interface 262 and the upper portion of the outer race 222 is tightly inserted into the mounting hole 211 (refer to FIG. 2a) of the drive arm 209. Then, a laser generator (not shown) is used to generate laser beam of high energy. The laser beam is directed to several welding spots (not shown) provided on one side of the drive arm 209 and located around the mounting hole 211 such that the drive arm 209 is welded on the first interface 262 by laser welding method. After that, the fantail spacer 208, with adhesive for example epoxy dispensed on its area around the through hole 212, is placed on the second interface 264 such that the fantail spacer 208 is partially pressed against the second interface 264 and the lower portion of the outer race 222 is tightly inserted into the through hole 212 (refer to FIG. 2a) of the fantail spacer 208. The fantail spacer 208 is thus secured on the second interface 264 of the flange 223 via the adhesive. Finally, the whole assembling process ends, thus forming a HSA as that shown in FIG. 2b.

Preferably, the flange 223 has a circular shape so as to provide a large contact area between its first interface 262 and the drive arm 209, and between its second interface 264 and the fantail spacer 208, thereby enhancing connectivity therebetween. The enhanced connectivity will prevent relative rotation between the outer race 222 and the drive arm 209, or between the outer race 222 and the fantail spacer 208.

Moreover, for sufficiently carrying the drive arm 209 and the fantail spacer 208, the flange 223 preferably is as thick as possible. It is also preferred that the distance from the first end surface 282 to the flange 223 is equal to that from the flange 223 to the second end surface 284, in other word, the flange 223 is located at midway between the two end surfaces. When a HSA with such configuration is assembled into a disk drive unit, this midway feature will make the entire HSA more stable.

Though in the embodiment, the drive arm 209 is described to be assembled to the outer race 222 prior to the fantail spacer 208, it is also possible to assembly the fantail spacer 208 in advance and then assembly the drive arm 209. Furthermore, though the fantail spacer 208 is shown to be mounted by means of adhesive, other method such as laser welding similar to the manner by which the drive arm 209 is mounted, may also be possible.

Compared with conventional HSA, since a flange is provide on an outer race of a pivot bearing assembly and between the two end surfaces of the outer race, the drive arm and the fantail spacer can be mounted on the flange respectively in such a manner that the drive am and fantail spacer are fastened on opposite sides (interfaces) of the flange, by suitable means such as laser welding and/or adhesive for e.g. epoxy, thus constituting a HSA without any additional components such as screw nut and washer both of which are inevitably necessary in a conventional HSA. Therefore, a HSA of simplified construction is achieved, and accordingly, manufacturing cost thereof is also reasonably reduced.

Figure 5:
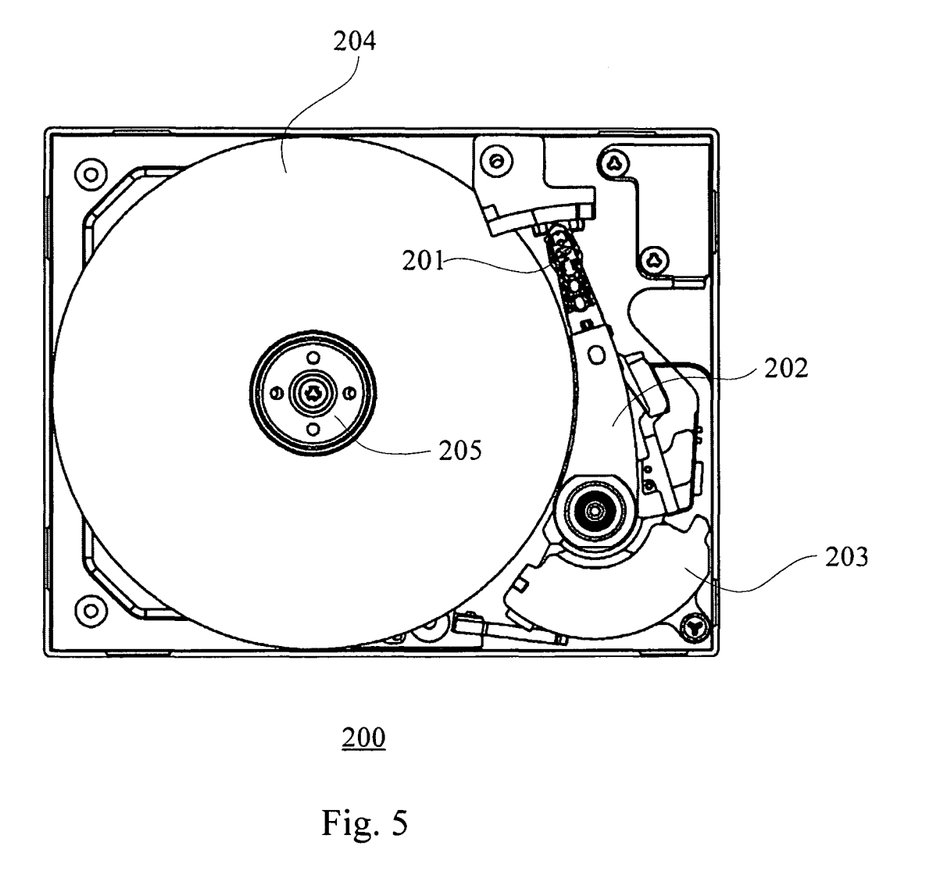
FIG. 5 shows a top plan view of a disk drive unit according to an embodiment of the invention.

FIG. 5 illustrates a disk drive unit 200 incorporating a HSA 202 described above with reference to FIGS. 2a-2c and FIGS. 3-4. The disk drive unit 200 comprises a disk 204, a spindle motor 205 for spinning the disk 204, a HSA 202 with a slider 201, and a voice coil motor 203 to rotate the HSA 202 such that the slider 201 moves across the surface of the disk 204.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the invention.

What is claimed is:

1. A head stack assembly, comprising:
a pivot bearing assembly having a main body comprising a first end surface and a second end surface, and a flange extended from the main body and located between the first and second end surfaces, the flange having a first interface adjacent the first end surface of the main body and a second interface opposite to the first interface;
one drive arm mounted on the main body and secured on the first interface of the flange; and
one fantail spacer mounted on the main body and secured on the second interface of the flange, the fantail spacer being physically separated from and connected to the drive arm via the flange;
wherein the drive arm has a mounting hole defined therein, and an upper portion of the main body from the first end surface to the first interface of the flange is received in the mounting hole, and the fantail spacer has a through hole defined therein, and a lower portion of the main body from the second interface of the flange to the second end surface of the main body is received in the through hole.

2. The head stack assembly according to claim 1, wherein the drive arm is secured on the first interface of the flange by means of laser welding.

3. The head stack assembly according to claim 1, wherein the fantail spacer is secured on the second interface of the flange by means of adhesive.

4. The head stack assembly according to claim 3, wherein the adhesive is epoxy.

5. The head stack assembly according to claim 1, wherein the fantail spacer is secured on the second interface of the flange by means of laser welding.

6. The head stack assembly according to claim 1, wherein the flange is a circular shape.

7. A disk drive unit, comprising:
a disk;
a spindle motor for spinning the disk;
a head stack assembly; and
a voice coil motor to rotate the head stack assembly such that the head stack assembly can move across the surface of the disk, wherein the head stack assembly comprises:
a pivot bearing assembly having a main body comprising a first end surface and a second end surface, and a flange extended from the main body and located between the first and second end surfaces, the flange having a first interface adjacent the first end surface of the main body and a second interface opposite to the first interface;
one drive arm mounted on the main body and secured on the first interface of the flange; and
one fantail spacer mounted on the main body and secured on the second interface of the flange, the fantail spacer being physically separated from and connected to the drive arm via the flange;
wherein the drive arm has a mounting hole defined therein, and an upper portion of the main body from the first end surface to the first interface of the flange is received in the mounting hole, and the fantail spacer has a through hole defined therein, and a lower portion of the main body from the second interface of the flange to the second end surface of the main body is received in the through hole.

* * * * *